May 22, 1951  W. MELAS  2,554,374
METER WITH MAGNETICALLY COUPLED INDICATOR
Filed Feb. 15, 1947  4 Sheets-Sheet 1

INVENTOR.
William Melas
BY
ATTORNEY.

INVENTOR.
William Melas

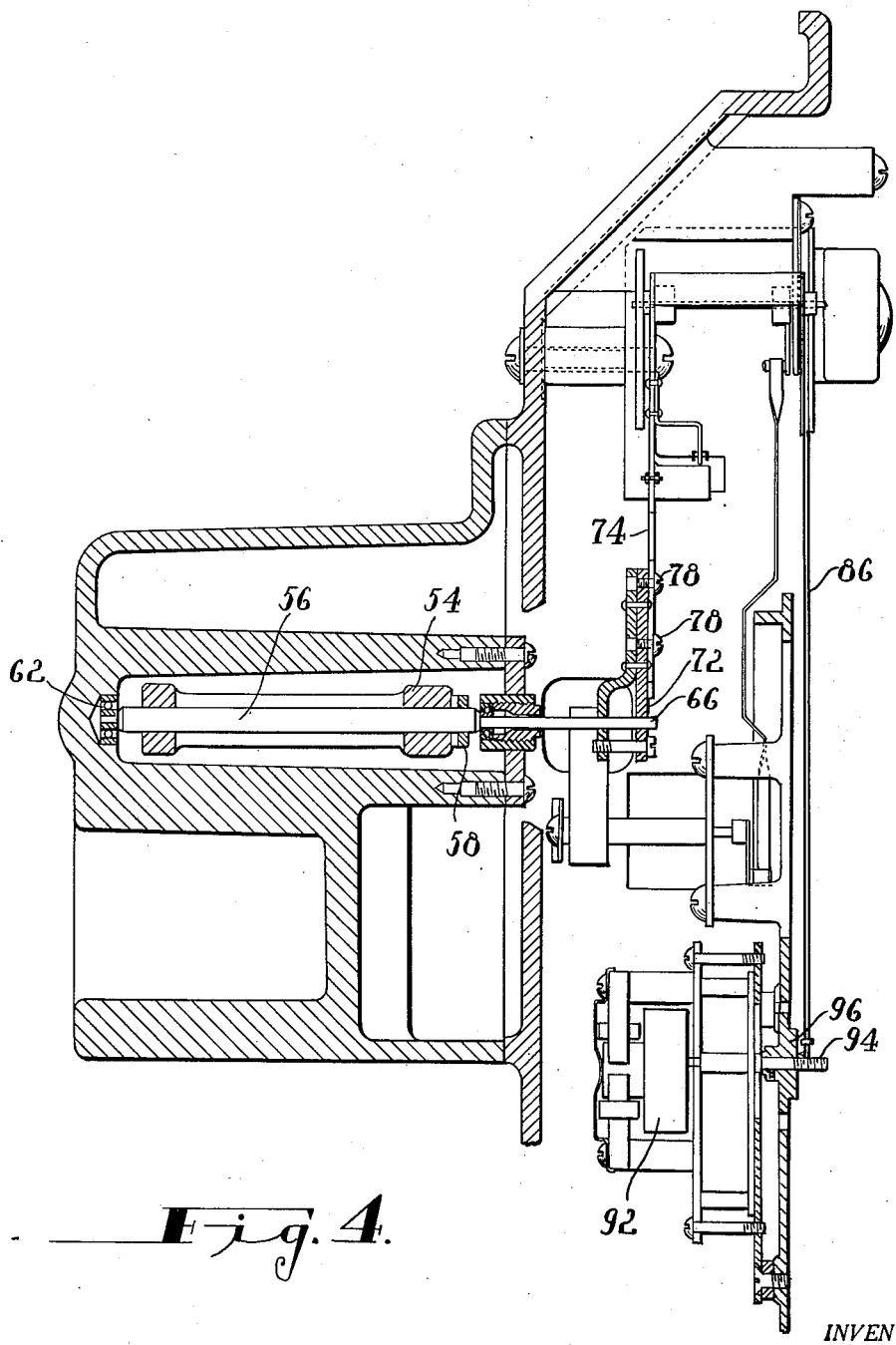

May 22, 1951 W. MELAS 2,554,374
METER WITH MAGNETICALLY COUPLED INDICATOR
Filed Feb. 15, 1947 4 Sheets-Sheet 4
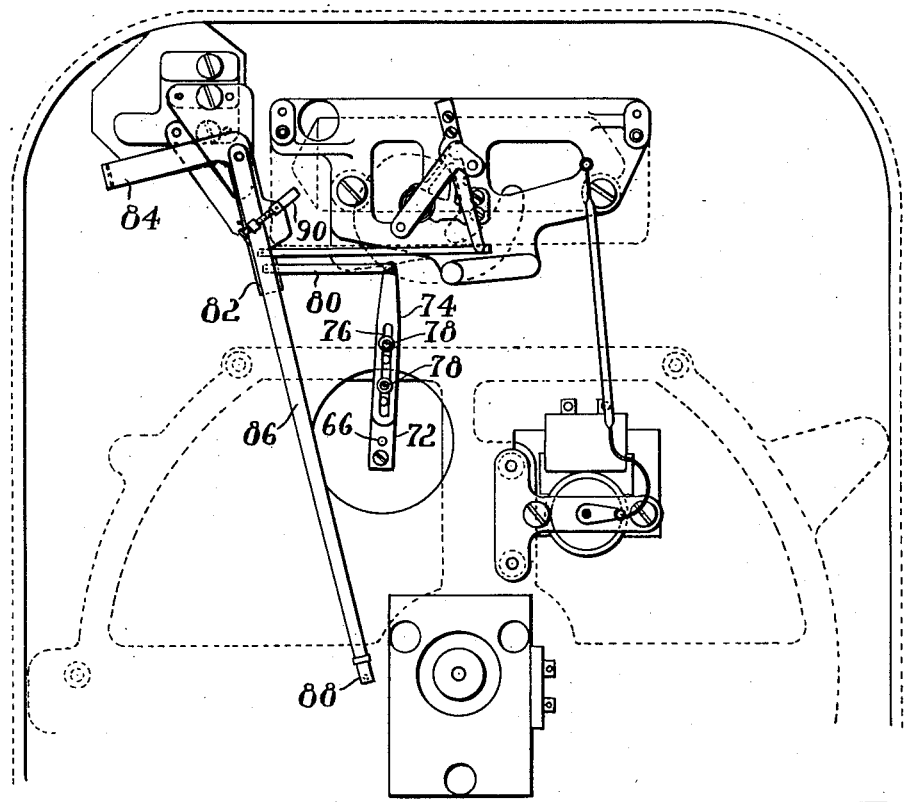
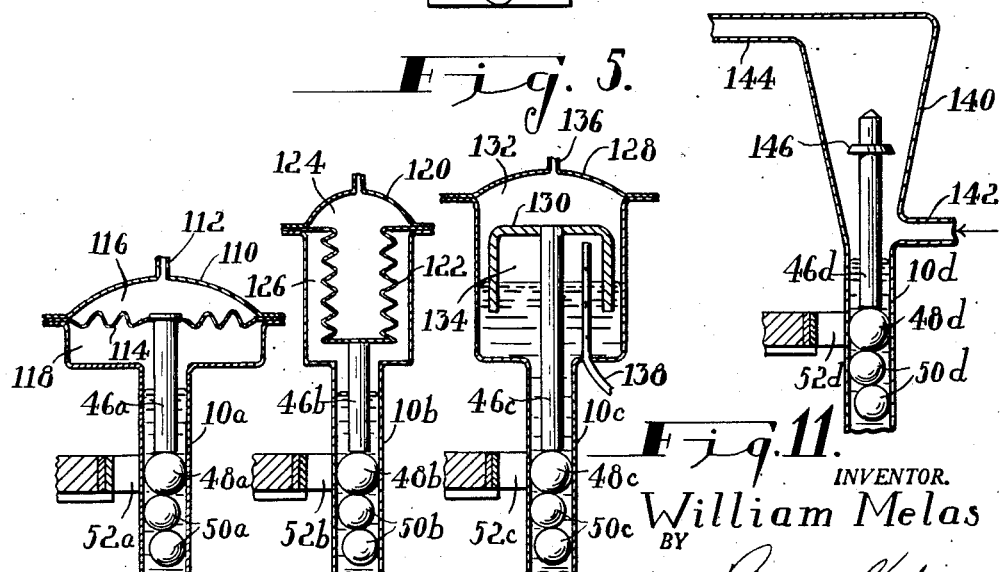
INVENTOR.
William Melas
BY
ATTORNEYS Patented May 22, 1951

2,554,374

UNITED STATES PATENT OFFICE 2,554,374

METER WITH MAGNETICALLY COUPLED INDICATOR

William Melas, Philadelphia, Pa., assignor, by mesne assignments, to Reconstruction Finance Corporation, Philadelphia, Pa., a corporation of the United States Application February 15, 1947, Serial No. 728,817

3 Claims. (Cl. 73—403)

This invention relates to a meter involving a movable element from which motion is to be transmitted.

The movable element may derive its movement from various causes, e. g. pressure differences, flow or other variables.

Meters of the general type just indicated have the usual disadvantage, when fluid conditions are being measured, of involving the necessity for taking movements from devices responsive to conditions in spaces which should be sealed from the atmosphere. This end has been accomplished electrically by causing a movable plunger to vary one or more inductances, but the mechanical transmission of movement involves the use of stuffing boxes for the passage of plungers or the use of flexible diaphragms or the like, all of which involve either frictional or other restraints on the movable parts.

In accordance with the present invention movements from parts in an hermetically sealed or otherwise isolated enclosure are transmitted by a magnetic coupling in such fashion as to impose no substantial restraints on movements. Specifically in accordance with the present invention a float or other vertically movable element is magnetically coupled to recording or indicating mechanism in which friction is held to a minimum with resulting high sensitivity of the meter. Dynamic damping may be readily provided to reduce oscillation of the moving parts. A specific advantageous adaptation of the invention is to a manometer of the float type adapted for the measurement of fluid pressure differences.

The general object of the invention is the provision of an improved meter of the type just indicated.

A further object of the invention is the provision of means for readily adjusting the ratio of movement of a recording or indicating device with respect to the movement of a float.

These and other objects of the invention particularly relating to details of construction and operation will be apparent from the following description read in conjunction with the accompanying drawings, in which:

Figure 4 is a vertical section taken through the axis of the magnet-carrying lever and illustrating the connections to a recording pen as well as the arrangement of a chart driving motor;

Figure 5 is a fragmentary front elevation of the meter indicating the recording elements;

Figures 8, 9, 10 and 11 are diagrammatic sectional views showing adaptations of the invention to various forms of meters.

Figure 1:
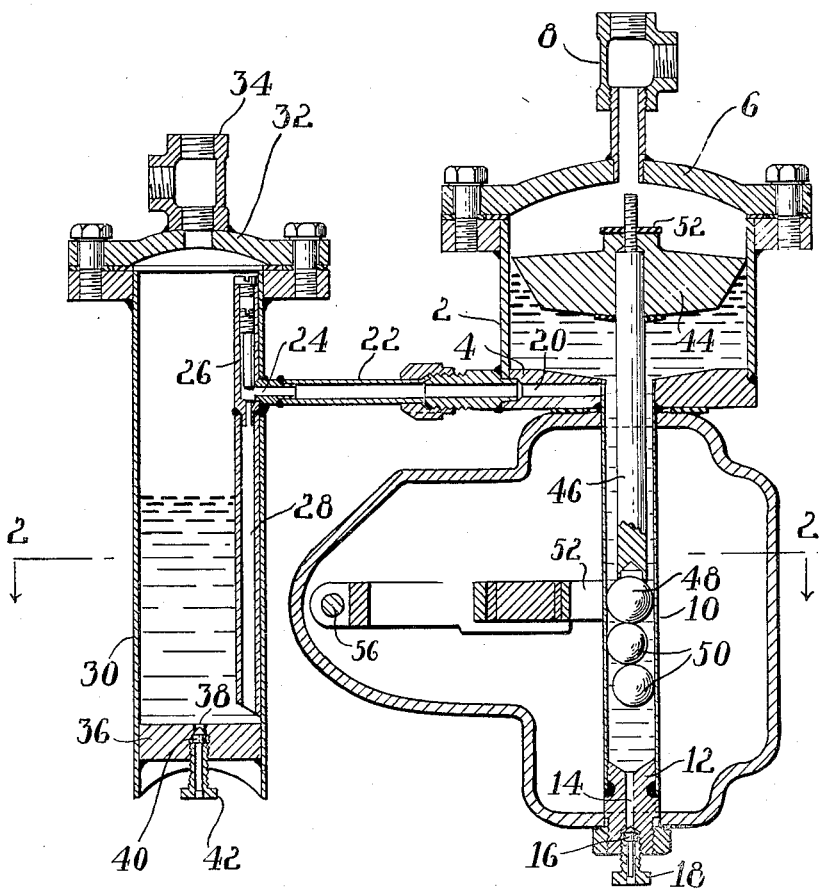
Figure 1 is a vertical section through an improved manometer of the float type, the section being taken on the vertical plane indicated at 1—1 in Figure 2.

Referring first to Figure 1 there is illustrated therein a float chamber 2 having a bottom 4 welded thereto and provided with a cover 6 provided with connections indicated generally at 8 which communicate with a low pressure line communicating, for example, with the downstream side of an orifice if the meter is to be used for measuring flow. As will be evident, the meter responds to pressure differentials and may be used for the measurement of any variable giving rise to such differentials. Projecting downwardly from the bottom of the chamber 2 is a tube 10 provided with a bottom plug 12 having a drain opening 14 normally closed by a valve element 16 held in closing position by a screw plug 18. Through an opening 20 in the bottom 4 of the chamber 2 communication is afforded between the interiors of the chamber 2 and the tube 10 and a connecting tube 22 which, in turn, communicates through an opening 24 with the upper end of a tube 28, the communication being adjustable by means of a needle valve 26 which may be closed to a sufficient extent to provide a damping action on the movement of liquid through the connections just described. The tube 28 is open at its lower end in communication with the interior of a chamber 30 within which it is located. This chamber 30 is provided with a cover 32 having connections 34 for communication with a high pressure line which, in the case of a flowmeter as previously mentioned, may have communication with the upstream side of an orifice. The bottom of the chamber 30 is closed by a plug 36 provided with a drain opening 38 normally closed by a valve member 40 held in closing position by a screw 42.

As will be evident from the above description, the chamber system is hermetically sealed against the atmosphere and if a suitable quantity of mercury or other liquid is located therein dangerous vapors or gases may be connected to the high and low pressure ends of the apparatus without possibility of escape or even admixture if that is to be avoided.

Within the chamber 2 there is located a float 44 of suitable material. If the liquid used in the manometer is mercury this float may be formed of cast iron. On the other hand, if water or other lighter liquid is used the float may be of correspondingly suitable buoyant solid material or may be of hollow floating construction. A stem 46 extends downwardly from the float into the tube 10 and below it there are located a series of balls of which the uppermost, 48, is of magnetic material, being, for example, if mercury is used, a solid carbon steel ball. This ball has a diameter slightly less than the inner diameter of tube 10 so as to be freely movable in the liquid, the liquid flowing past its sides. The rod 46 should be of non-magnetic material which, if mercury is the liquid, may be of any material not attacked by the mercury. If a lighter liquid than mercury is used the parts should, of course, be correspondingly lighter and in such case a solid steel ball at 48 may be replaced by a hollow steel ball which, by the action of one or more floating balls 50 beneath it, for example of hollow glass, hardwood or the like, will be supported in contact with the lower end of the rod 46. In general, the float is of such nature as to float on the surface of the liquid and buoyant light balls 50 maintain a magnetic ball such as 48 in engagement with the lower end of the stem 46.

As will be evident, the vertical position of the ball 48 will correspond to the difference in pressure in the two legs of the manometer. In accordance with the present invention the position of this steel ball is transmitted externally of the tube 10 through magnetic coupling thereto. The stem 46, the tube 10 and the balls 50 being non-magnetic, it will be evident that the position of the ball 48 may be accurately followed by a magnet, such as 52, carried by a balanced lever 54 on a spindle 56 having ball bearings supporting it at 62 and 64. The end play of the spindle 56 is adjusted by adjusting the endwise thrust of a screw 65 surrounding the projecting spindle end 66 which actuates the recording mechanism. The lever 54 is adjustably secured to the spindle 56 by the clamping action of an angular piece 58 which may be secured in clamping position by a screw 60. The magnet 52 is retained in the end of the lever 54 by solder at 53. This method of attachment to the lever is convenient and desirable since the magnet is preferably of a powerful type consisting of Alnico or similar material not easily machined.

The opposite end of the lever carries a second magnet 68 held by solder 69 and having its ends on opposite sides of a copper plate 70 supported in the frame of the meter to provide damping of the lever.

The end 66 of the spindle has clamped thereon an arm assembly indicated at 72 which adjustably carries extension 74 connected at its upper end through a link 80 to the pen yoke 84 on which the stylus arm 86 is pivoted for adjustment by the screw 90 so as to adjust to proper initial position the pen 88 with respect to a conventional chart mounted upon the spindle 94 against the hub 96, the spindle 94 being driven by the usual clock motor 92 which may be of mechanical or electrical synchronous motor type.

If the various parts associated with the spindle 66 are well damped it will be evident that the spindle 56 will follow very accurately the position of the steel ball 48 and consequently will give accurate indications and records through the stylus 86 of the pressure differences to which the manometer responds. Damping of the flow of liquid such as mercury between the chambers 2 and 30 is effected by the needle valve 26 while damping of the lever 54 is effected by the induction of eddy currents in the copper plate 70 by any motion of the magnet 68. Through the use of the magnetic coupling the chambers and connections containing the manometer liquid may be hermetically sealed while, nevertheless, motions of the float will be transmitted mechanically to the indicating or recording devices.

In the upper portion of Figure 5 there is illustrated the conventional and well-known integrator which may also be operated as part of the recording system to give the time integral of the variable which is being measured. This integrator mechanism forms no part of the present invention and is accordingly merely indicated.

Figure 6:
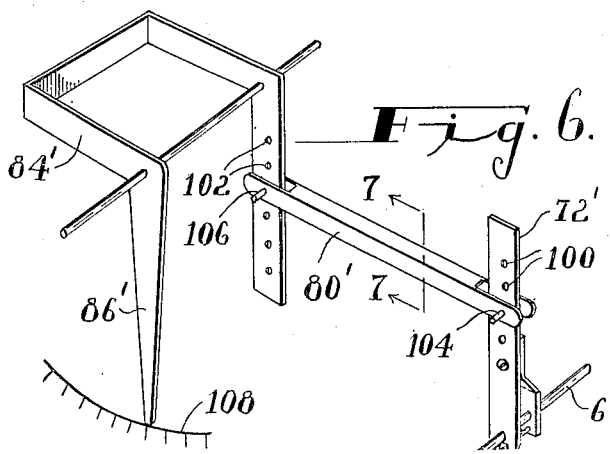
Figure 6 is a diagrammatic elevation illustrating a modified connection arrangement between the follower shaft and a pen to enable different ratios to be easily secured.
Figure 7:
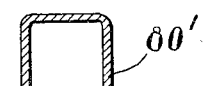
Figure 7 is a section taken on the plane indicated at 7—7 in Figure 6.
Figure 2:
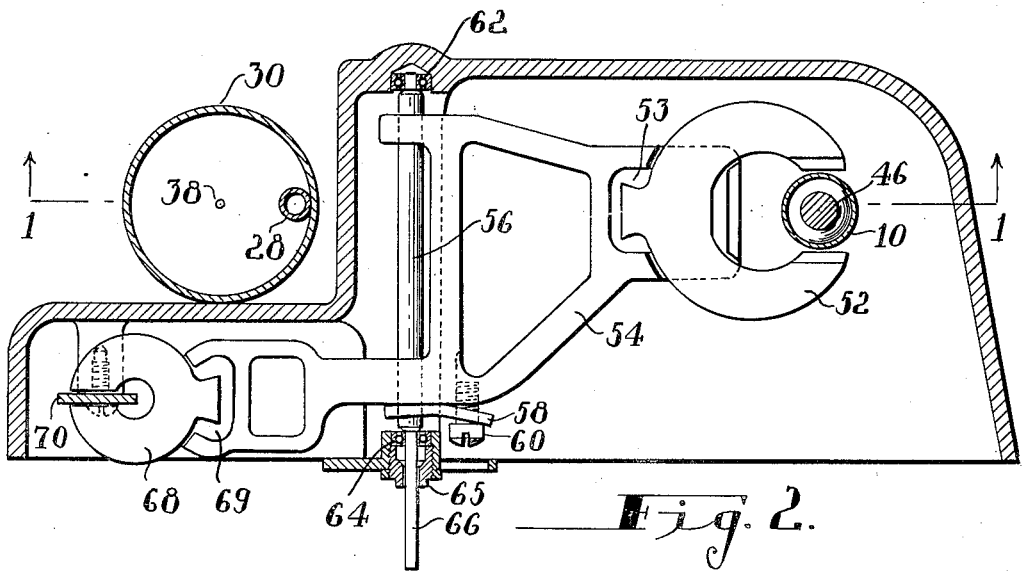
Figure 2 is a horizontal section through the same taken on the plane indicated at 2—2 in Figure 1.
Figure 3:
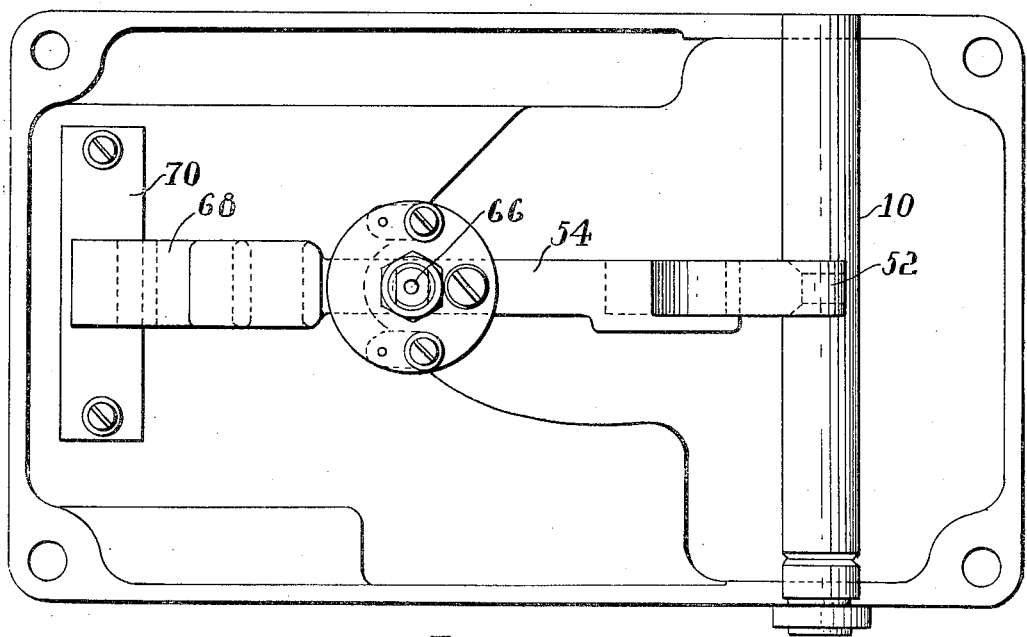
Figure 3 is a partial elevation illustrating in particular the construction and mounting of a magnet-carrying lever.

Figure 6 illustrates a modified arrangement in which instead of a continuous form of adjustment of the ratio of movements of the spindles 66 and stylus arm 86 there is provided quick adjustment for particular fixed ratios between these elements. The spindle 66', corresponding to 66, carries an arm 72' which is provided with a series of openings 100. A yoke 84' corresponding to 84 and carrying an indicating point 86' cooperating with a scale 108, or alternatively a recording stylus designed to mark a chart as previously described, is provided with similar holes 102. Pins 104 and 106 are insertable in the holes 100 and 102 and are arranged to be embraced by the ends of a connecting link 80' of a channel section as indicated in Figure 7. By reference to a suitable table the user of the instrument may readily locate the pins 104 and 106 so as to secure certain ratios between the spindle 66' and the indicating or recording arm.

While permanent magnets have been indicated at 52 and 68 it will be evident that electromagnets may be used at these points, current being led thereto through suitable flexible leads which will have no detrimental effects on freedom of movement.

The use of a steel ball such as 48 immersed in a liquid such as mercury, and in particular buoyed by glass balls or the like such as at 50 provides a well lubricated system capable of accurately following the movements of the float spindle 46. The balls are kept clean and consequently the possibility of frictional resistance to movement is at a minimum.

The invention so far has been described as applied to a manometer provided with a float following changes in liquid level. It will be evident that the invention is equally applicable to other types of meters as illustrated in Figures 8 to 11, inclusive. In Figure 8 a spindle 46a extends into mercury in a cylindrical tube 10a. Beneath it is a steel ball 48a and glass balls 50a serving to insure good contact with the lower end of a spindle. The magnet 52a corresponding to magnet 52 follows the position of the ball 48a. In this case the spindle 46a is attached to a diaphragm 114 in a chamber 110, dividing the chamber into two regions, 116 and 118, the first of which communicates with a pressure source to be measured through the connection indicated at 112. It may be here noted that the mercury may, by proper choice of the weights of the parts, serve to support buoyantly the diaphragm and the spindle to such extent, if desired, that for a certain diaphragm position the diaphragm may be subjected to substantially no net mechanical force. The chamber 118 may be closed as indicated so that variation of pressure therein occurs with movements of the diaphragm, or alternatively, it may be vented to the atmosphere or connected to another pressure source depending upon the particular characteristics of the meter which are desired.

In Figure 9 the parts 19b, 46b, 48b and 52b will be recognized as corresponding to parts of similar designation without the letters previously described. In this case the rod 46b is connected to an expansible bellows 122 in an enclosure 120, provided by the bellows with two chambers 124 and 126.

Figure 10 is again similar with parts similar to those previously described indicated by corresponding numerals with the letter c added. A spindle 46c carries a cup 130 having its flanges projecting below the surface of the mercury in the enclosure 128. Two chambers 132 and 134 are formed thereby. These communicate respectively through opening 136 and through the tube 138 with pressure sources.

In Figure 11 there are indicated by the letter d appended to numerals certain parts previously described by corresponding numerals. Figure 11 indicates a flowmeter in which the rod 46d carries a so-called float or baffle 146 in the tapered tube 140 through which flow of fluid, either liquid or gaseous, occurs from the entrance passage 142 to the exit passage 144. The movable parts take a position of equilibrium depending upon the rate of flow in the fashion common to such tapered tube flowmeters.

It will be evident from the above that the magnetic coupling arrangement is of quite general application and the invention is not to be construed as limited except to the extent required by the following claims.

What I claim and desire to protect by Letters Patent is:

1. A meter comprising a chamber containing liquid, an elongated member having its lower end immersed in said liquid and movable lengthwise in accordance with changes of a variable, a sphere of magnetic material buoyantly held by said liquid in engagement with the lower end of said member and free to rotate relatively to said member and the walls of said chamber, indicating means external to the chamber, and magnetic coupling between the sphere and the indicating means so that the latter follows movements of the former, said magnetic coupling including a magnet external to said chamber and mounted to follow said sphere in its movements.

2. A meter comprising a chamber containing liquid, an elongated member having its lower end immersed in said liquid and movable lengthwise in accordance with changes of a variable, a sphere of magnetic material located below the lower end of said member, at least one ball lighter than said liquid and located below said sphere to urge said sphere buoyantly into engagement with the lower end of said member, said sphere and ball being free to rotate relatively to said member and the walls of said chamber and the chamber being of restricted horizontal cross-section to maintain the lower end of said member, the sphere and said ball in approximate vertical alignment, indicating means external to the chamber, and magnetic coupling between the sphere and the indicating means so that the latter follows movements of the former, said magnetic coupling including a magnet external to said chamber and mounted to follow said sphere in its movements.

3. A meter comprising a cylindrical chamber containing liquid, a first elongated member having its lower end immersed in said liquid and movable lengthwise in accordance with changes of a variable, a second member of magnetic material, movable with the first member at the lower end thereof and immersed in said liquid, the second member having a spherical surface of less radius than the inner cylindrical surface of the chamber and being arranged to roll on the said cylindrical surface, the second member being rotatable relatively to the first member, indicating means external to the chamber, and magnetic coupling between the second member and the indicating means so that the latter follows movements of the former, said magnetic coupling including a magnet external to said chamber and mounted to follow the second member in its movements.

WILLIAM MELAS.

REFERENCES CITED

The following references are of record in the file of this patent:

UNITED STATES PATENTS

| Number | Name | Date |
|---|---|---|
| 1,396,560 | Dickinson | Nov. 8, 1921 |
| 1,858,346 | Straughan | May 17, 1932 |
| 2,233,572 | Atkins | Mar. 4, 1941 |
| 2,260,516 | Gerber | Oct. 28, 1941 |
| 2,448,477 | Wasko et al. | Aug. 31, 1948 |

FOREIGN PATENTS

| Number | Country | Date |
|---|---|---|
| 193,955 | Switzerland | Feb. 1, 1938 |
| 535,746 | Germany | Oct. 15, 1931 |

OTHER REFERENCES

An article entitled New Type of Vacuum Gages by John Dubrovin, published in Instruments, October 1933, p. 194, vol. 6. (A photostat copy is in 73–403 in Division 36 and a copy is in the Scientific Library of the U. S. Patent Office.)